United States Patent Office 3,489,762
Patented Jan. 13, 1970

3,489,762
NICKEL CHELATES OF 2,5-BIS(HYDROXYARYL) THIAZOLO[5,4-d]THIAZOLES AND PROCESSES FOR PRODUCING THE SAME
Melvin S. Bloom and Gordon C. Newland, Kingsport, Tenn., assignors to Eastman Kodak Company, Rochester, N.Y., a corporation of New Jersey
No Drawing. Original application July 17, 1964, Ser. No. 383,509, now Patent No. 3,324,077, dated June 6, 1967. Divided and this application June 2, 1967, Ser. No. 646,792
Int. Cl. C07f 15/04; C08f 45/62
U.S. Cl. 260—299                                4 Claims

ABSTRACT OF THE DISCLOSURE

Nickel chelates of 2,5-bis(hydroxyaryl)thiazolo[5,4-d] thiazoles having the following formulas:

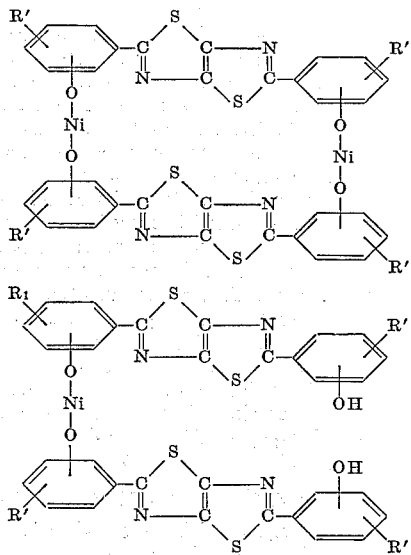

the R' in each formula in each case being a radical independently selected from the group consisting of hydrogen, $C_1$–$C_{18}$ alkoxyl and $C_1$–$C_{18}$ alkyl radicals.

---

This application is a division of Ser. No. 383,509, filed on July 17, 1964 (now U.S. Patent No. 3,324,077, issued June 6, 1967).

This invention resides in the chemical arts. It pertains to 1-olefin resins and relates to the problem of stabilizing them relative to ultraviolet light.

Normally solid polymers of 1-olefins, such as the well-known normally solid polyethylene and crystalline polypropylene, are thermoplastic, synthetic resins which have gained wide spread use as materials of construction. However, as is well known, normally solid, 1-olefin resins undergo a photochemical degradation when exposed to ultraviolet light. This effect is frequently termed weathering. It appears to be a photooxidation process which causes rupture of the polymer chains and formation of carbonyl (=C=O) groups. As this degradation progresses, articles manufactured from 1-olefin resins tend to crack, become brittle and lose tensile strength to the extent of mechanical failure.

This invention is based upon the discovery that certain bis(arylidene)dithiooxamides, the corresponding 2,5-bisarylthiazolo[5,4-d]thiazoles, nickel chelates of bis(hydroxyarylidene)dithiooxamides and nickel chelates of 2,5-bis(hydroxyaryl)thiazolo[5,4-d]thiazoles confer on 1-olefin resins a high degree of stability to embrittlement by action of ultraviolet light.

In summary, this invention comprises a normally solid, thermoplastic composition consisting essentially of a normally solid, 1-olefin resin portion and, at an ultraviolet light stabilizing concentration, material selected from the group consisting of bis(arylidene)dithiooxamides represented by the formula:

(1) 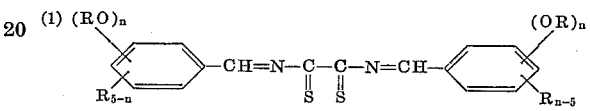

wherein R in each case is a radical independently selected from the group consisting of hydrogen and $C_1$–$C_{18}$ alkyl radicals and n is 1–5, 2,5-bisarylthiazolo[5,4-d]thiazoles represented by the formula:

(II) 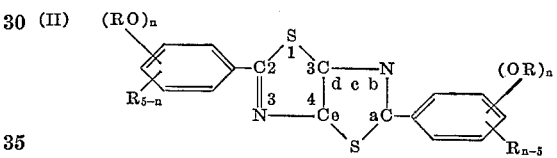

wherein R in each case is a radical independently selected from the group consisting of hydrogen and $C_1$–$C_{18}$ alkyl radicals and n is 1–5, nickel chelates of bis(hydroxyarylidene)dithiooxamides, which are represented by the formulas:

(III) 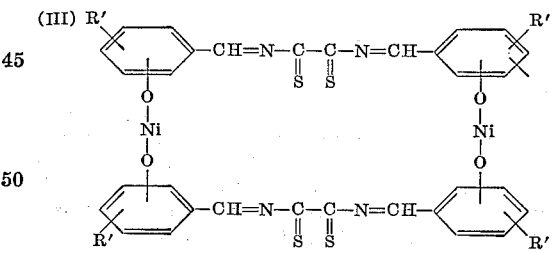

(IV) 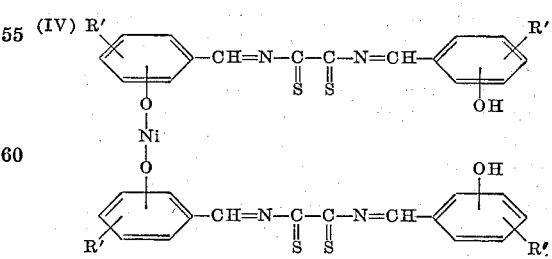

wherein R′ in each case is a radical independently selected from the group consisting of hydrogen, $C_1$–$C_{18}$ alkoxyl and $C_1$–$C_{18}$ alkyl radicals, and nickel chelates of 2,5-bis-(hydroxyaryl)thiazolo[5,4-d]thiazoles, which are represented by the formula:

(V) 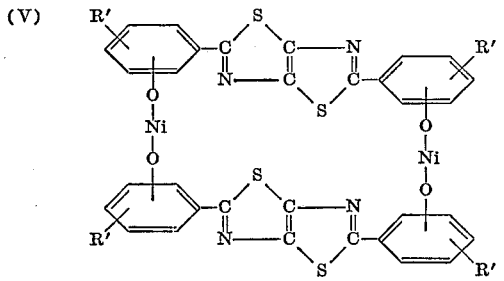

(VI) 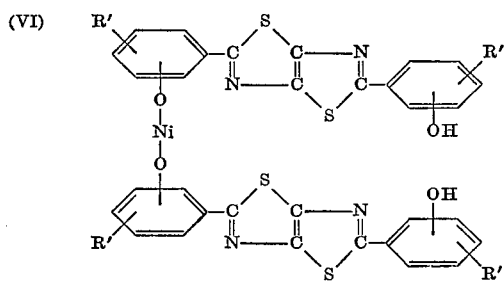

wherein R′ in each case is a radical independently selected from the group consisting of hydrogen, $C_1$–$C_{18}$ alkoxyl and $C_1$–$C_{18}$ alkyl radicals, and mixtures thereof.

The normally solid, 1-olefin resin portion of the normally solid plastic composition of this invention consists essentially of at least one, normally solid, 1-olefin polymer. Such a polymer, commonly referred to generically as a poly-α-olefin, is one which is derived from a 1-monoolefinic hydrocarbon having 2–20 carbon atoms, generally 2–10 carbon atoms, preferably 2–6 carbon atoms and commonly 2–4 carbon atoms. It is also provided by the normally solid copolymers, which include graft polymers, addition polymers, block polymers and the like, of 1-monoolefinic hydrocarbons having 2–20 carbon atoms, generally 2–10 carbon atoms, preferably 2–6 carbon atoms and commonly 2–4 carbon atoms, as well as of these 1-monoolefinic hydrocarbons and other compounds. Examples of a normally solid polymer derived from a 1-monoolefinic hydrocarbon having 2–20 carbon atoms include the linear and branched, low density and high density, crystalline and amorphous, normally solid, homopolymers and copolymers of ethylene, propylene, 1-butene, isobutylene, 1-pentent, 2-methyl-1-pentent, 3-methyl-1-butene, 1-hexene, 3,3-dimethyl-1-butene, 1-heptene, 1-octene, 1-nonene, 1-decene, 4-methyl-1-pentene, 4-methyl-1-hexene, 5-ethyl-1-hexene, 6-methyl-1-heptene, 6-ethyl-1-heptene, styrene, allkyl benzene, and the like. Processes for preparing a normally solid 1-olefin polymer are well known and described in detail in the prior art. See, for example, the U.S. Patent, No. 2,153,553, to Fawcett et al., the U.S. Patent, No. 2,912,429, to Cash and the U.S. Patent, No. 2,917,500, to Hagemeyer et al. In general, a normally solid, 1-olefin resin is a thermoplastic material which at 20° C. is solid. It includes the so-called poly-α-olefin waxes which usually have average molecular weights in a range from about 3,000 to about 12,000.

The normally solid, 1-olefin resin portion of the poly-α-olefin composition of this invention, in addition to at least one normally solid, 1-olefin resin, can also comprise other polymeric components. Thus, it can comprise a normally solid resin derived from another 1-monoolefinic hydrocarbon having 2–20 carbon atoms. It can comprise a different kind of polymer, generally present as a physical property improver.

The normally solid, 1-olefin resin compositions of this invention can also comprise other additives such as, for example, antioxidants, thermal stabilizers, anticorrosion additives, antistatic agents, foaming agents, plasticizers, colorants such as dyes and pigments, waxes, mold release agents, slip agents, anti-blocking agents, fillers, extenders, and the like, including physical property improvers other than polymeric compounds.

The compounds which under the concepts of this invention function as ultraviolet light inhibitors for 1-olefin resins are readily available or can be readily synthesized. See, for instance, the article by J. R. Johnson and R. Ketcham [J. Am. Chem. Soc. 82, 2719 (1960)]. Examples of these compounds and of procedures for synthesizing them are as follows.

Bis(salicylidene)dithiooxamide

A mixture of 6 grams (0.05 mole) of dithiooxamide and 63 grams (0.5 mole) of salicylaldehyde is stirred at 230° C. After water evaporation begins, the temperature of the mixture is maintained for 5 minutes. Thereafter, the resulting reaction mixture is cooled and poured into 400 milliliters of ether-ethanol at a 1:1 volumetric ratio. The solid material is removed by filtration and recrystallized from cyclohexanone. The recrystallized material is the desired product and consists essentially of bis(salicylidene)dithiooxamide. A typical melting point of the product is 250–253° C.

2,5-bis(3-methoxy-4-hydroxyphenyl)thiazolo-[5,4-d]thiazole 20 grams (0.166 mole) of dithiooxamide, 100 grams (0.66 mole) of vanillin and 30 grams (0.32 mole) of phenol are admixed and established and maintained at an elevated temperature in a flask on an oil bath at a temperature at 220° C. The solid materials in the reaction mixture go into solution and water evaporation takes place. After water evaporation has begun, the flask is maintained in the oil bath at 220° C. for 30 minutes. The reaction mixture thus obtained is cooled and then diluted with 200 milliliters of ethanol. The resulting precipitate is removed by filtration from the reaction mixture, taken up in cyclohexanone and then crystallized therefrom. The resulting product consists essentially of 2,5-bis(3-methoxy-4 - hydroxyphenyl)thiazolo[5,4 - d]thiazole. A typical quantity of the product is 12 grams, representing a yield of 19%. A typical melting point of the product is 264–265° C. Typical analytical data for the product are: Calcd. for $C_{18}H_{14}O_4N_2S_2$: C, 56.0; H, 3.6; N, 7.2; S, 16.6. Found: C, 56.5; H, 3.7; N, 7.2; S, 15.9.

2,5-bis(p-methoxyphenyl)thiazo[5,4-d]thiazole

A mixture of 24 grams (0.2 mole) of dithiooxamide and 216 grams (1.7 moles) of anisaldehyde is stirred for 40 minutes in a flask on an oil bath established and maintained at 220° C. The reaction mixture thus obtained is cooled and poured into ethanol. The resulting precipitate is a crude product consisting essentially of 2,5-bis-(p-methoxyphenyl)thiazolo[5,4-d]thiazole. A typical yield of the crude product is 48 grams. The crude product is taken up in hot cyclohexanone and recrystallized therefrom. A typical melting point of the product is 352° C. with a solid-liquid crystal transition at 274–276° C. Typical analytical data for the crystallized product is: Calcd. for $C_{18}H_{14}N_2S_2O_2$: C, 61.00; H, 3.98; N, 7.91; S, 18.10. Found: C, 60.82; H, 4.36; N, 7.81; S, 17.96.

2,5-bis(3,4-dimethoxyphenyl)thiazolo[5,4-d]thiazole

A mixture of 4 grams (0.034 mole) of dithiooxamide and 46.5 grams (0.28 mole) of 3,4-dimethoxybenzaldehyde is heated with stirring for one hour in a flask on an oil bath established and maintained at 230° C. At the end of this time the resulting reaction mixture is washed with boiling ethanol and then taken up in warm cyclohexanone and recrystallized therefrom. The product thus obtained consists essentially of 2,5-bis(3,4-dimethoxyphenyl)thiazolo[5,4-d]thiazole. A typical melting point of the product is 261–262° C. Typical analytical data for the product are: Calcd. for $C_{10}H_{10}N_2S_1O_4$: C, 57.95; H, 4.38; N, 6.76; S, 15.47. Found: C, 58.33; H, 4.69; N, 6.53; S, 15.57.

2,5-bis(o-hydroxyphenyl)thiazolo[5,4-d]thiazole 6 grams (0.05 mole) of dithiooxamide and 63 grams (0.5 mole) of salicylaldehyde are admixed for 10 minutes in a flask on an oil bath established and maintained at a temperature of 230° C. The resulting reaction mixture is diluted with 75 grams of ethanol and cooled. The product thus obtained is washed with ethanol and ether. The resulting solid material is taken up in warm cyclohexanone and then by cooling recrystallized therefrom. The recrystallized material consists essentially of 2,5-bis-(o-hydroxyphenyl)thiazolo[5,4-d]thiazole. A typical melting point of the product is 295–298° C.

2,5-bis(p-hydroxyphenyl)thiazolo[5,4-d]thiazole

A suspension of 4.5 grams (0.013 mole) of 2,5-bis(p-methoxyphenyl)thiazolo[5,4-d]thiazole in 135 milliliters of 48% hydrobromic acid is refluxed for 7 hours. The resulting reaction product comprises solid material which, after separation from the reaction mixture by filtration and crystallization from cyclohexanone is a product consisting essentially of 2,5-bis(p-hydroxyphenyl)thiazolo[5,4-d]thiazole. A typical melting point of the product is 355–358° C.

2,5-bis(2,4-dihydroxyphenyl)thiazolo[5,4-d]thiazole

This compound is made by condensing 2,4-dihydroxybenzaldehyde and dithiooxamide. It is also synthesized by the hydrolysis of the corresponding dimethoxyphenyl- or methoxyhydroxyphenyl-thiazolo[5,4-d]thiazole.

2,5-bis(4-dodecyloxy-2-hydroxylphenyl)-thiazolo[5,4-d]thiazole

This compound is synthesized by the selective alkylation of 2,5-bis(2,4-dihydroxyphenyl)thiazolo[5,4-d]thiazole. It is also synthesized by the selective alkylation of 2,4-dihydroxybenzaldehyde followed by condensation with dithiooxamide.

2,5-bis(o-dodecyloxyphenyl)thiazolo[5,4-d]thiazole

This compound is prepared by alkylation with a dodecyl halide of 2,5-bis(o-hydroxyphenyl)thiazolo[5,4-d]thiazole.

Nickel chelate of bis(salicylidene)dithiooxamide

A hot solution of 0.80 gram (0.0024 mole) of bis(salicylidene)dithiooxamide in 100 milliliters of cyclohexanone is added to 0.60 gram (0.0024 mole) of nickel acetate in hot ethanol. On standing, a red solid forms in the hot solution and precipitates. The precipitate is removed therefrom by filtration and residual solvent is removed therefrom by evaporation. The result is a product consisting essentially of the nickel chelate of bis(salicylidene)-dithiooxamide. A typical quantity of the product thus obtained is 1.0 gram.

Nickel chelate of 2,5-bis(o-hydroxyphenyl)-thiazolo[5,4-d]thiazole

To 0.33 gram (0.001 mole) of 2,5-bis(o-hydroxyphenyl)thiazolo[5,4-d]thiazole in 50 milliliters of boiling cyclohexanone is added 0.25 gram (0.001 mole) of nickel acetate in 50 milliliters of boiling ethanol. Typically there occurs an immediate precipitation of a buff colored solid. The reaction mixture is refluxed with stirring for 30 minutes, cooled and, after admixing with it an equal volume of diethyl ether, filtered. The filter cake after removal of residual solvent by evaporation is typically a finely divided material. The powder consists essentially of the nickel chelate of 2,5-bis(o-hydroxyphenyl)thiazolo[5,4-d]thiazolo. A typical quantity of the powder is 0.6 gram.

Concentration of the ultraviolet light inhibitor of this invention in the normally solid plastic composition depends generally upon the degree of ultraviolet light stabilization desired. This in turn depends upon a number of factors including subsequent environmental conditions to which the plastic composition is intended to be exposed. In general, however, a concentration of the ultraviolet light stabilizer in a range from about 0.1 to about 10% by weight of the total 1-olefin resin content of the composition is sufficient for satisfactory results in most end uses of the composition.

The normally solid, 1-olefin resin composition of this invention is made by incorporating the ultraviolet light stabilizer into the normally solid resin portion of the composition. Generally, such incorporation is performed by any one of a number of known methods, such as, for example, roll compounding, extrusion, solvent mixing and the like. For instance, such incorporation can be performed by heating or otherwise softening the normally solid resin portion to a workable consistency and then working in, as by roll compounding, the ultraviolet light stabilizer until a substantially uniform blend or dispersion is obtained. Generally, such incorporation takes place at the same time that other additives are normally incorporated into the resin portion of the compound and usually along with such other additives as the formulation of the particular plastic composition requires.

The normally solid plastic composition of this invention is useful in coatings and as a material of construction for shaped articles. Thus, the composition can be made into various shaped articles such as, for example, pellets, sheeting, films, bars, tubes, filaments, fibers, especially shaped structural elements and the like as by conventional casting and molding techniques which include extrusion, blow molding and the like.

This invention is further illustrated by the following examples of various aspects thereof, including preferred specific embodiments of the invention. This invention is not limited to these specific embodiments unless otherwise indicated.

Examples 1–7

These examples illustrate specific embodiments of a polypropylene composition of this invention.

The formulations of these embodiments are set forth in the following Table I.

TABLE I

| Components | Example | | | | | | |
|---|---|---|---|---|---|---|---|
| | 1 | 2 | 3 | 4 | 5 | 6 | 7 |
| Crystalline polypropylene | 100 | 100 | 100 | 100 | 100 | 100 | 100 |
| Bis(salicylidene)dithiooxamide | 5 | | | | | | |
| 2,5-bis(p-hydroxyphenyl)thiazole[5,4-d]thiazole | | 5 | | | | | |
| 2,5-bis(o-hydroxyphenyl)thiazole[5,4-d]thiazole | | | 5 | | | | |
| 2,5-bis(o-dodecyloxyphenyl)thiazole[5,4-d]thiazole | | | | 5 | | | |
| 2,5-bis(3-methoxy-4-hydroxyphenyl)thiazole[5,4-d]thiazole | | | | | 5 | | |
| Nickel chelate of bis(salicylidene)dithiooxamide | | | | | | 5 | |
| Nickel chelate of 2,5-bis(o-hydroxyphenyl)thiazole[5,4-d]thiazole | | | | | | | 5 |

The specific embodiments according to these formulations are made by admixing the crystalline polypropylene with the other component or components called for in each formulation. Such admixing can be performed in warm tetralin with the polypropylene being completely dissolved therein. In such case the resulting dope is generally cast and the tetralin evaporated to leave a film of the polypropylene composition.

The specific compositions thus obtained are useful in films, coatings and in the fabrication of shaped articles.

Examples 8–14

These examples illustrate specific embodiments of a poly(1-octadecene) composition of this invention.

The formulations of these embodiments are set forth in the following Table II.

TABLE II

| Components | \multicolumn{7}{c}{Example} | | | | | | |
|---|---|---|---|---|---|---|---|
| | 8 | 9 | 10 | 11 | 12 | 13 | 14 |
| Normally solid poly-1-oxadecene | 100 | 100 | 100 | 100 | 100 | 100 | 100 |
| Bis(salicylidene)dithiooxamide | 5 | | | | | | |
| 2,5-bis(p-hydroxyphenyl)thiazole [5,4-d]thiazole | | 5 | | | | | |
| 2,5-bis(o-hydroxyphenyl)thiazole [5,4-d]thiazole | | | 5 | | | | |
| 2,5-bis(o-dodecyloxyphenyl)thiazole [5,4-d]thiazole | | | | 5 | | | |
| 2,5-bis(3-methoxy-4-hydroxyphenyl) thiazole[5,4-d]thiazole | | | | | 5 | | |
| Nickel chelate of bis(salicylidene) dithiooxamide | | | | | | 5 | |
| Nickel chelate of 2,5-bis(o-hydroxyphenyl)thiazole[5,4-d]thiazole | | | | | | | 5 |

The specific embodiments according to these formulations are made by dry blending the components called for in each formulation.

The specific compositions thus obtained are useful in films, coatings and in the fabrication of shaped articles.

The ultraviolet light stability of the 1-olefin resin composition of this invention is demonstrated by the following data obtained in the ultraviolet light stability testing of samples of various polypropylene compositions. Each sample was prepared by making a dope of a commercially available, crystalline polypropylene and tetralin and in each case adding five parts by weight of the additive indicated in the following Table III to 100 parts by weight of the crystalline polypropylene contained in the dope. After heating the components of the composition in a test tube at 145° C. for 30 minutes, the resulting dope was cast onto a ferro-type plate which was established and maintained at a temperature of 143° C. After evaporation of the solvent from the cast dope, which required about 10 minutes at the temperature of 143° C., the plate and resulting film were quenched in water and the film peeled from the plate. A test specimen (2.5 inch x 0.5 inch) of the film in each case was exposed to artificial weathering in a modified Atlas Twin-Arc Weather-Ometer [Anal. Chem., 25, 460 (1953)]. The exposure time required to render the film brittle when creased with the exposed side of the film on the outside of the fold was thereby determined. From the exposure times for each specimen; one of which was of a film of polypropylene containing no additive, a stabilization rating was calculated for each additive. The stabilization rating is the ratio of exposure time required to embrittle the film with additive to the exposure time required to embrittle the film without additive. The results of the stability testing are set forth in the following Table III.

TABLE III

| Sample No. | Additive | Stabilization Rating |
|---|---|---|
| 1 | None | 1 |
| 2 | 2-hydroxy-4-methoxybenzophenone | 2 |
| 3 | 2,5-bisphenylthiazolo[5,4-d]thiazole | 1 |
| 4 | 2,5-bis(o-methylphenyl)thiazolo[5,4-d]thiazole | 1 |
| 5 | Bis(salicylidene)dithiooxamide | 11 |
| 6 | 2,5-bis(p-hydroxyphenyl)thiazolo[5,4-d]thiazole | 3 |
| 7 | 2,5-bis(o-hydroxyphenyl)thiazolo[5,4-d]thiazole | 5 |
| 8 | 2,5-bis(o-dodecyloxyphenyl)thiazolo[5,4-d]thiazole | 6 |
| 9 | 2,5-bis(3-methoxy-4-hydroxyphenyl)thiazolo [5,4-d]thiazole | 13 |
| 10 | Nickel chelate of bis(salicylidene)dithiooxamide | 18 |
| 11 | Nickel chelate of 2,5-bis(o-hydroxyphenyl)thiazolo [5,4-d]thiazole | 14 |

Samples 4-11 correspond to the compositions of Examples 1-7.

These data show that the bis(oxygenated arylidene)dithiooxamide, 2,5-bis(oxygenated aryl)thiazolo[5,4-d]thiazoles, nickel chelate of bis(hydroxyarylidene)dithiooxamide and nickel chelate of 2,5-bis(hydroxyaryl)thiazolo[5,4-d]thiazoles are effective ultraviolet light stabilizers for polypropylene. The data of the table illustrate that the 2,5-bisphenylthiazolo[5,4-d]thiazole and the 2,5-bis(o-methylphenyl)thiazolo[5,4-d]thiazole have no effect on weatherability of polypropylene film. However, substitution of hydroxy and alkoxy radicals on the phenyl groups improve the stabilization obtained by a factor of 3–6. When both alkoxy and hydroxy radicals were substituted on the phenyl groups, outstanding stabilization was obtained. These data also show that the additives of this invention are more effective than a commercially available benzophenone type ultraviolet light inhibitor.

Other advantages, features and embodiments of this invention will be apparent to those in the exercise of ordinary skill in the art after reading the foregoing disclosure. In this regard, while specific embodiments of this invention have been described in considerable detail, variations and modifications of these embodiments can be effected.

We claim:
1. Nickel chelates of 2,5-bis(hydroxyaryl)thiazolo-[5,4-d]thiazoles, which are represented by the formulas:

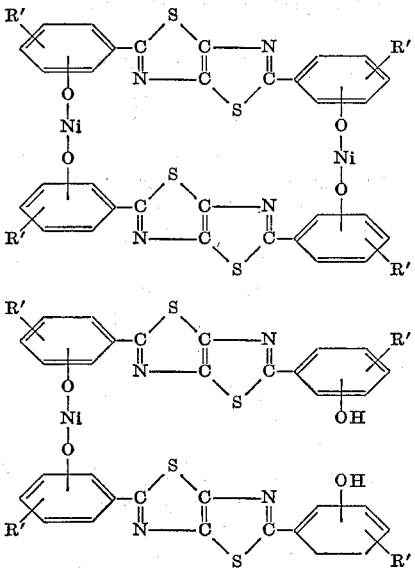

the R' in each formula in each case being a radical independently selected from the group consisting of hydrogen, $C_1$–$C_{18}$ alkoxyl and $C_1$–$C_{18}$ alkyl radicals.

2. Nickel chelate of 2,5-bis(o-hydroxyphenyl)thiazolo-[5,4-d]thiazole.

3. A process for making a nickel chelate selected from the group of nickel chelates of formulas V and VI as set forth in claim 1, which comprises: admixing (1) in boiling cyclohexanone a compound selected from the group consisting of 2,5-bisarylthiazolo[5,4-d]thiazoles represented by formula

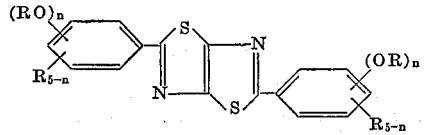

wherein R in each case is a radical independently selected from the group consisting of hydrogen and $C_1$–$C_{18}$ alkyl radicals and $n$ is 1–5 wherein R is at least one -OR substituent in each phenyl ring is a hydrogen radical, with (2) nickel acetate in boiling ethanol.

4. A process according to claim 3 wherein said compound is 2,5-bis(o-hydroxyphenyl)thiazolo[5,4-d]thiozole.

No references cited.

ALEX MAZEL, Primary Examiner
R. J. GALLAGHER, Assistant Examiner

U.S. Cl. X.R.
252—402; 260—306.8, 439, 551, 567

PO-1050
(5/69)

UNITED STATES PATENT OFFICE
CERTIFICATE OF CORRECTION

Patent No. 3,489,762                    Dated   January 13, 1970

Inventor(s)  Melvin S. Bloom and Gordon C. Newland

It is certified that error appears in the above-identified patent and that said Letters Patent are hereby corrected as shown below:

Column 1, lines 32-43, the second formula in the Abstract of the Disclosure should read:

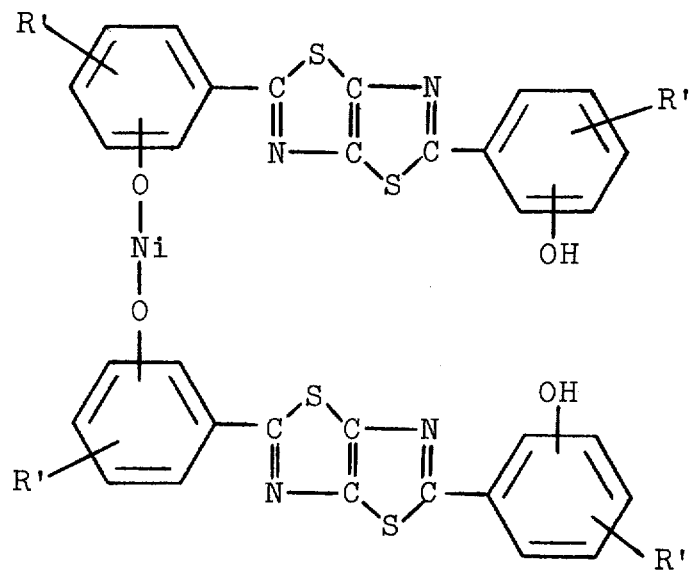

Column 2, lines 19-24, formula (1) should read:

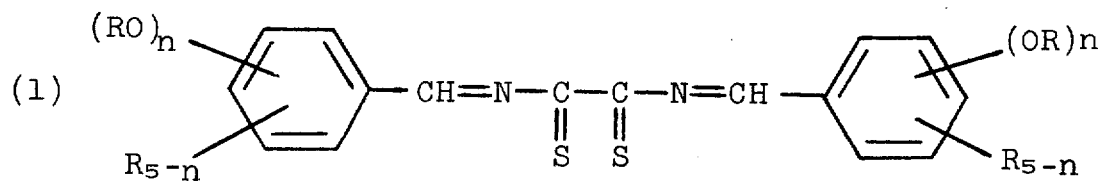

PO-1050
(5/69)

UNITED STATES PATENT OFFICE
CERTIFICATE OF CORRECTION

Patent No. 3,489,762      Dated January 13, 1970

Inventor(s) Melvin S. Bloom and Gordon C. Newland

It is certified that error appears in the above-identified patent and that said Letters Patent are hereby corrected as shown below:

- 2 -

Column 2, lines 30-35, formula (II) should read:

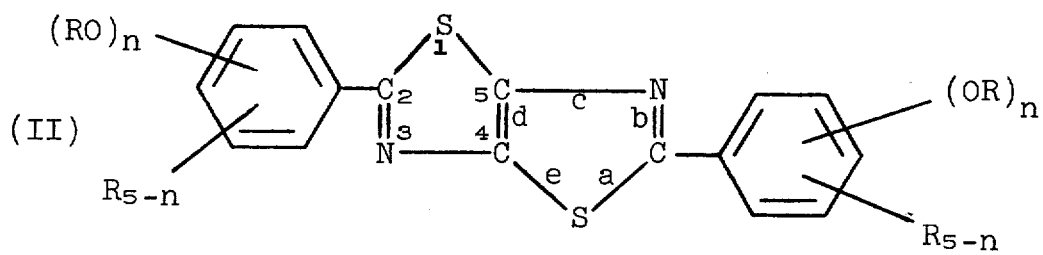

Column 2, lines 43-53, formula (III) should read:

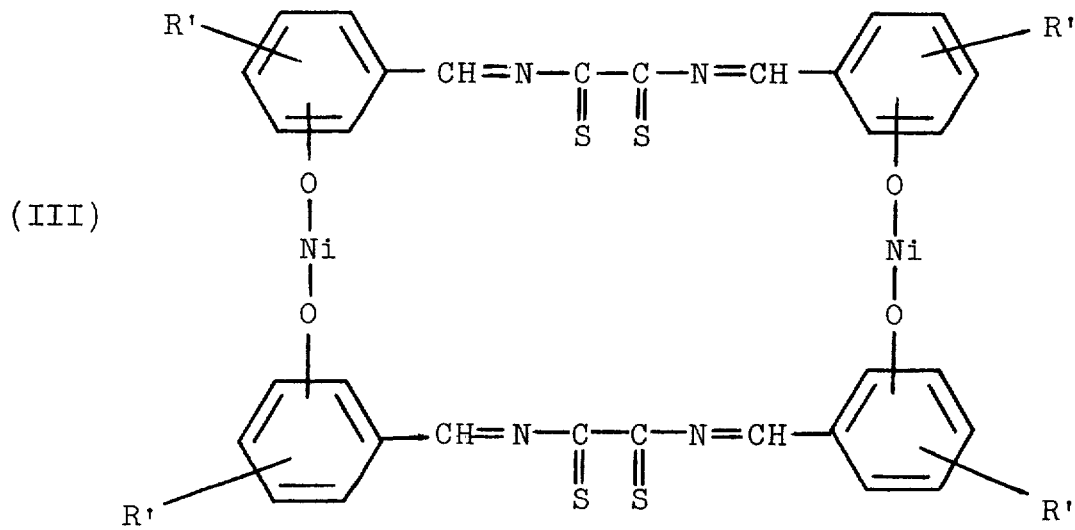

UNITED STATES PATENT OFFICE
CERTIFICATE OF CORRECTION

Patent No. 3,489,762  Dated January 13, 1970

Inventor(s) Melvin S. Bloom and Gordon C. Newland

It is certified that error appears in the above-identified patent and that said Letters Patent are hereby corrected as shown below:

- 3 -

Column 3, line 52, the word "1-pentent" should read ---1-pentene---. Column 3, lines 52 and 53, the word "2-methyl-1-pentent" should read ---2-methyl-1-pentene---. Column 3, line 56, the word "allkyl" should read ---allyl---. Column 4, line 51, "2,5-bis(p-methoxyphenyl)thiazo[5,4-d]thiazole" should read ---2,5-bis(p-methoxyphenyl)thiazolo[5,4-d]thiazole---. Column 5, line 3, after the first semicolon. should read: ---Calcd. for $C_{20}H_{18}N_2S_2O_4$---.

In Column 5, line 75, the word "thiazolo" should read ---thiazole---. In Column 6, Table 1, the third line under the Components should read ---2,5-bis(p-hydroxyphenyl)thiazolo---. In Column 6, Table 1, the fifth line under the Components should read ---2,5-bis(o-hydroxyphenyl)thiazolo---. In Column 6, Table 1, the seventh line under the Components should read ---2,5-bis(o-dodecyloxyphenyl)thiazolo---. In Column 6, Table 1, the tenth line under the Components should read ---thiazolo[5,4-d]thiazole---. In Column 6, Table 1, the fourteenth line under the Components should read ---phenyl)thiazolo[5,4-d]thiazole---. In Column 7, Table II, the third line under the Components should read ---2,5-bis(p-hydroxyphenyl)thiazolo---. In Column 7, Table II, the fifth line under the Components should read ---2,5-bis(o-hydroxyphenyl)thiazolo---. In Column 7, Table II, the seventh line

PO-1050
(5/69)

UNITED STATES PATENT OFFICE
CERTIFICATE OF CORRECTION

Patent No. 3,489,762      Dated January 13, 1970

Inventor(s) Melvin S. Bloom and Gordon C. Newland

It is certified that error appears in the above-identified patent and that said Letters Patent are hereby corrected as shown below:

- 4 - under the Components should read ---2,5-bis(o-dodecyloxyphenyl)thiazolo---. In Column 7, Table II, the tenth line under the Components should read ---thiazolo[5,4-d]thiazole---. In Column 7, Table II, the fourteenth line under the Components should read ---phenyl)thiazolo[5,4-d]thiazole---.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents